US012809574B2

(12) United States Patent
Walker

(10) Patent No.: US 12,809,574 B2
(45) **Date of Patent: *Nov. 24, 2026**

(54) SPEAKER CONTROL BASED ON SIGNAL SOURCE

(71) Applicant: SimpliSafe, Inc., Boston, MA (US)

(72) Inventor: Devin Walker, Somerville, MA (US)

(73) Assignee: SimpliSafe, Inc., Boston, MA (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/663,922

(22) Filed: May 14, 2024

(65) Prior Publication Data

US 2025/0355613 A1 Nov. 20, 2025

(51) Int. Cl.

| | |
|---|---|
| ***G06F 3/16*** | (2006.01) |
| ***G08B 13/196*** | (2006.01) |
| ***G10L 15/22*** | (2006.01) |
| ***H04R 29/00*** | (2006.01) |

(52) U.S. Cl.

CPC .............. *G06F 3/165* (2013.01); *G06F 3/167* (2013.01); *G08B 13/19678* (2013.01); *G10L 15/22* (2013.01); *H04R 29/002* (2013.01); *H04R 2430/01* (2013.01)

(58) Field of Classification Search

CPC ... G06F 3/165; G06F 3/167; G08B 13/19678; G08B 3/10; G08B 13/19602; G10L 15/22; H04R 29/002; H04R 2430/01; H04R 2227/003; H04R 3/04; H04R 27/00

USPC .......................................................... 704/275

See application file for complete search history.

(56) References Cited

U.S. PATENT DOCUMENTS

| | | | | |
|---|---|---|---|---|
| 4,316,060 | A * | 2/1982 | Adams | H04R 3/04 381/98 |
| 6,091,826 | A * | 7/2000 | Laitinen | H04R 27/00 381/56 |
| 6,473,604 | B1 | 10/2002 | Hinkle et al. | |
| 7,706,551 | B2 | 4/2010 | Falcon | |
| 10,292,000 | B1 * | 5/2019 | Milne | H03G 7/002 |
| 10,297,250 | B1 * | 5/2019 | Blanksteen | G10L 15/32 |
| 10,394,521 | B1 * | 8/2019 | Cramer | H03G 5/025 |

(Continued)

FOREIGN PATENT DOCUMENTS

WO 2024025123 A1 2/2024

OTHER PUBLICATIONS

International Search Report received in International Application No. PCT/US2025/026758 mailed Aug. 19, 2025, 4 pages.

(Continued)

*Primary Examiner* — Thuykhanh Le

(74) *Attorney, Agent, or Firm* — Secant IP, P.L.L.C.

(57) ABSTRACT

Systems and methods for controlling a speaker. In one example, a method includes determining, based on a request to operate a speaker, a type of sound to be produced by the speaker, the request being indicative of whether operation of the speaker is for a communication session or to produce a system sound, and adjusting one or more parameters of the speaker to output (i) speech, based on the request indicating that operation of the speaker is to be for the communication session, or (ii) the system sound, based on the request indicating that the operation of the speaker is to produce the system sound. An example of the method further includes initiating operation of the speaker using the one or more parameters to produce the type of sound.

20 Claims, 14 Drawing Sheets

(56) References Cited

U.S. PATENT DOCUMENTS

| | | | | |
|---|---|---|---|---|
| 11,336,986 | B2 * | 5/2022 | Grinker | G10K 11/1785 |
| 11,449,305 | B2 * | 9/2022 | Yang | G06F 3/165 |
| 11,575,990 | B2 * | 2/2023 | Herbig | H04R 1/406 |
| 11,595,754 | B1 * | 2/2023 | Johnson | G06F 30/20 |
| 12,009,877 | B1 | 6/2024 | Eubank et al. | |
| 12,076,643 | B2 * | 9/2024 | Peeler | A63F 13/86 |
| 12,200,458 | B1 * | 1/2025 | Nawfal | H04R 5/027 |
| 12,248,733 | B1 | 3/2025 | Walker | |
| 2002/0118848 | A1 * | 8/2002 | Karpenstein | H04H 60/04 381/119 |
| 2003/0035555 | A1 * | 2/2003 | King | H03G 5/005 381/103 |
| 2004/0136549 | A1 * | 7/2004 | Pennock | G10H 1/02 381/1 |
| 2006/0177046 | A1 | 8/2006 | Falcon | |
| 2007/0244611 | A1 * | 10/2007 | Brozovich | G07C 5/008 701/31.5 |
| 2009/0015425 | A1 | 1/2009 | Palmqvist et al. | |
| 2009/0116667 | A1 | 5/2009 | Lin et al. | |
| 2013/0142360 | A1 * | 6/2013 | Potard | H03G 3/20 381/98 |
| 2014/0044286 | A1 * | 2/2014 | Coles | G06F 1/1694 381/150 |
| 2015/0125000 | A1 * | 5/2015 | Makivirta | H03G 5/165 381/103 |
| 2015/0263692 | A1 * | 9/2015 | Bush | H04R 3/04 381/103 |
| 2015/0362998 | A1 | 12/2015 | Park et al. | |
| 2016/0057555 | A1 * | 2/2016 | Schuster | H04R 29/001 381/59 |
| 2016/0197590 | A1 * | 7/2016 | Koppens | G06F 3/165 381/106 |
| 2016/0249126 | A1 * | 8/2016 | Konjeti | H04R 1/1091 |
| 2017/0070195 | A1 * | 3/2017 | Arknæs-Pedersen | H03F 3/187 |
| 2017/0099458 | A1 * | 4/2017 | Johnson | H04S 7/305 |
| 2017/0300289 | A1 * | 10/2017 | Gattis | G10L 19/018 |
| 2018/0197560 | A1 * | 7/2018 | Trivi | H04M 9/08 |
| 2019/0018645 | A1 * | 1/2019 | McClellan | H03G 5/005 |
| 2019/0028076 | A1 * | 1/2019 | Takahashi | H03G 3/3026 |
| 2019/0288657 | A1 * | 9/2019 | Arunachalam | H04R 3/04 |
| 2019/0311718 | A1 | 10/2019 | Huber et al. | |
| 2019/0331828 | A1 * | 10/2019 | Mutlu | G06F 3/0416 |
| 2020/0042285 | A1 * | 2/2020 | Choi | H04R 3/04 |
| 2020/0133621 | A1 * | 4/2020 | Milne | H03G 7/002 |
| 2020/0329327 | A1 * | 10/2020 | Gerrard | H04R 5/04 |
| 2020/0366991 | A1 * | 11/2020 | Freeman | H04S 7/30 |
| 2020/0396535 | A1 * | 12/2020 | Zastoupil | G06F 3/0484 |
| 2021/0004201 | A1 | 1/2021 | Munoz et al. | |
| 2021/0098013 | A1 | 4/2021 | Day | |
| 2021/0105563 | A1 * | 4/2021 | Marten | H04R 5/04 |
| 2021/0112354 | A1 * | 4/2021 | Hartung | H04R 29/007 |
| 2021/0152940 | A1 * | 5/2021 | Chen | H04S 7/30 |
| 2021/0265966 | A1 * | 8/2021 | Port | G06F 3/165 |
| 2021/0272579 | A1 * | 9/2021 | Tamaru | G10L 17/00 |
| 2021/0296769 | A1 * | 9/2021 | Kallai | H01Q 3/24 |
| 2021/0318850 | A1 | 10/2021 | Thomas | |
| 2021/0365707 | A1 | 11/2021 | Mao et al. | |
| 2021/0385604 | A1 * | 12/2021 | Milne | H04S 7/301 |
| 2022/0012900 | A1 | 1/2022 | Chen et al. | |
| 2022/0060824 | A1 * | 2/2022 | Virolainen | H04S 7/30 |
| 2022/0179461 | A1 * | 6/2022 | North | G06F 1/1688 |
| 2022/0232334 | A1 * | 7/2022 | Goff | G06F 3/16 |
| 2022/0272464 | A1 * | 8/2022 | Das | H04R 25/558 |
| 2022/0368556 | A1 * | 11/2022 | Scalisi | H04N 23/632 |
| 2023/0007394 | A1 * | 1/2023 | Granger | H04R 3/04 |
| 2023/0036487 | A1 * | 2/2023 | Mariglio, III | H04R 3/00 |
| 2023/0041832 | A1 * | 2/2023 | Pucci | G06F 3/165 |
| 2023/0069729 | A1 * | 3/2023 | Torno | H04R 3/04 |
| 2023/0146772 | A1 * | 5/2023 | Snook | H04R 29/007 381/303 |
| 2023/0179935 | A1 * | 6/2023 | Binal | G06F 3/162 381/59 |
| 2023/0209262 | A1 * | 6/2023 | Nelson | A47C 7/727 381/301 |
| 2023/0239638 | A1 * | 7/2023 | Jackson | H04R 1/02 381/82 |
| 2023/0345094 | A1 * | 10/2023 | Jeong | G08B 25/08 |
| 2024/0048904 | A1 * | 2/2024 | Nielsen | H04R 3/00 |
| 2024/0064406 | A1 | 2/2024 | Veselinovic et al. | |
| 2024/0202936 | A1 | 6/2024 | Shin et al. | |
| 2024/0321286 | A1 | 9/2024 | Cassidy et al. | |
| 2024/0340581 | A1 * | 10/2024 | Fu | H03G 3/3078 |
| 2025/0110686 | A1 * | 4/2025 | Botcha | G06F 3/162 |
| 2025/0128016 | A1 * | 4/2025 | Nagatani | A61M 21/02 |
| 2025/0133644 | A1 * | 4/2025 | Warren | H04L 12/12 |
| 2025/0338074 | A1 * | 10/2025 | Schuster | G06F 3/0304 |

OTHER PUBLICATIONS

Written Opinion of the International Search Authority received in International Application No. PCT/US2025/026758 mailed Aug. 19, 2025, 4 pages.

* cited by examiner

SPEAKER CONTROL BASED ON SIGNAL SOURCE

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for adjusting (e.g., automatically adjusting) parameters and/or characteristics of a speaker based on a source of a signal representing sound to be output by the speaker. At least one example is directed to a method. The method includes determining, based on a request to operate a speaker, a type of sound to be produced by the speaker, the request being indicative of whether operation of the speaker is for a communication session or to produce a system sound, adjusting one or more parameters of the speaker to output (i) speech, based on the request indicating that operation of the speaker is to be for the communication session, or (ii) the system sound, based on the request indicating that the operation of the speaker is to produce the system sound, and initiating operation of the speaker using the one or more parameters to produce the type of sound.

According to another example, a device comprises a network interface configured to support a communication session between the device and a remote device, a speaker, and a controller configured to adjust one or more parameters of the speaker based on a source of an audio signal to be output by the speaker, the one or more parameters including at least one of an equalization setting or a compression setting, wherein the source of the audio signal is one of a first source or a second source, the first source being the communication session.

Another example is directed to one or more non-transitory computer-readable media storing sequences of instructions executable to control a security camera disposed at a location, the security camera including a speaker and a network interface. In one example, the sequences of instructions comprise instructions to apply a first speaker profile for processing audio signals output by the speaker, the first speaker profile including a first equalization setting and a first compression setting, establish, using the network interface, a communication session with a remote device, and based on establishing the communication session, apply a second speaker profile for processing the audio signals output by the speaker, the second speaker profile including a second equalization setting, different from the first equalization setting, and a second compression setting different from the first compression setting.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
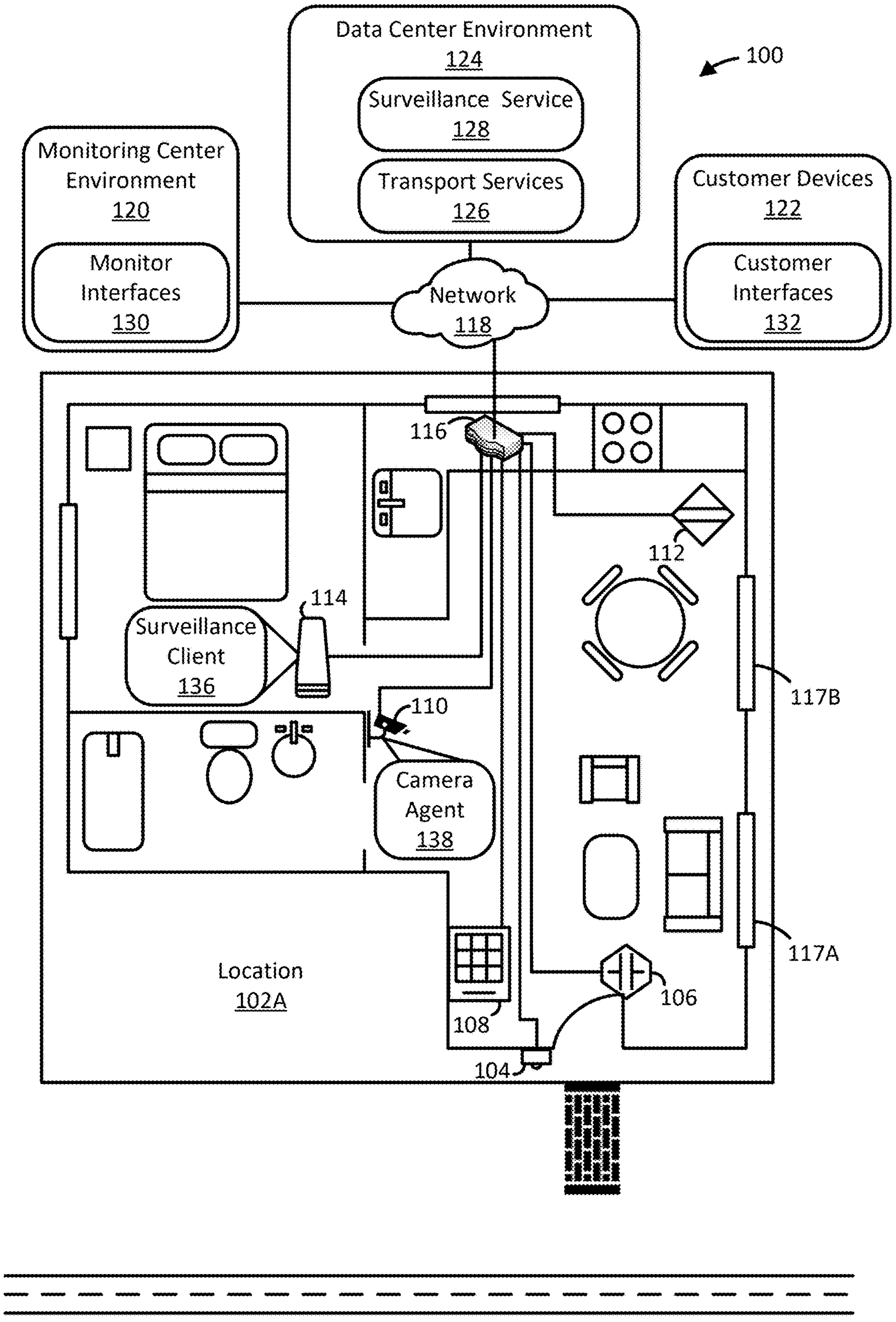
FIG. 1 is a schematic diagram of a security system, according to some examples described herein.

As summarized above, at least some examples disclosed herein relate to systems, such as home security systems or "smart home" systems, in which one or more signal processing parameters of a speaker can be adjusted based on the type of sound to be output by the speaker, so as to provide improved speaker performance for different types of audio signals.

Various devices that may be part of a security system or smart home system include a speaker that can be used for different purposes. As a result, the speaker may output sounds that have very different characteristics. For example, the speaker may be used to output processed audio in the form of various "system sounds," such as chimes, beeps, or other notification sounds, or a siren in the case of a security device, while also being used to output speech during a session (e.g., a communication session) involving a person. Characteristics of these two types of audio signals, namely processed and unprocessed audio, can vary significantly. As used herein, unprocessed audio signals (or unprocessed signals) refer to audio signals, such as those representing incoming speech, for example, that are unprocessed (e.g., to which little or no signal processing to alter sound characteristics of the audio has been applied) when received by the device. Such unprocessed signals may be highly dynamic and variable in terms of amplitude and/or frequency content, and potentially noisy. As such, these unprocessed audio signals may benefit from signal processing at the device prior to being output by the speaker, such as having certain gain, compression, and/or equalization settings applied to the signals, to make the speech reproduced by the speaker sound more natural, louder, and/or more clear. In contrast, as used herein, processed audio signals (or processed signals) refer to audio signals that, when received or accessed by the device (e.g., retrieved from computer-readable storage) for output by the speaker already have had audio signal processing applied. For example, processed audio signals may include pre-processed sounds (e.g., the system sounds described above) that have been created by a sound designer to have particular, well-defined audio characteristics that could be distorted or otherwise adversely affected if the same signal processing applied to speech or other unprocessed signals were applied to processed signals.

Accordingly, techniques are disclosed herein whereby a device can adjust (e.g., automatically adjust) the audio processing parameters (e.g., compression, gain, equalization, and/or other parameters) of a speaker based on the type of audio signal to be rendered or otherwise output by the speaker. For example, the device can be configured to process audio signals differently based on whether the signals represent unprocessed speech (or other unprocessed sound) or an already processed, pre-recorded sound (e.g., a chime or chirp sound). In some examples, the type of audio signal can be identified by the source of the audio signal. For example, processed audio signals may be obtained from a local device storage medium, whereas unprocessed speech signals may be obtained via a network connection during a communication session established between the device and another remote device. As described in more detail below, the device can be configured to adjust one or more parameters of the speaker, referred to herein collectively as a speaker "profile," based on the type of sound to be output by the speaker. For example, the device may adjust audio processing parameters (such as equalization, filtering, compression, gain, etc.), depending on the type of audio signal to be output, so as to optimize output of both otherwise unprocessed audio, such as speech, and pre-processed audio signals.

According to certain examples, a method comprises determining whether an audio signal to be rendered by a speaker comprises unprocessed speech, and based on determining that the audio signal comprises the unprocessed speech, adjusting one or more signal processing parameters of the speaker to modify one or more audio characteristics of sound output by the speaker. In one example, a method implemented by a device includes establishing a communication session with a remote device, and receiving, from the remote device, an audio stream comprising unprocessed speech. Based on establishing the communication session one or more signal processing parameters of a speaker of the device can be adjusted to modify one or more audio characteristics of sound output by the speaker in a manner that may enhance the audio quality of the speech output by the speaker. The method may thus include producing, with the speaker, an audio output based on processing the audio stream according to the one or more signal processing parameters of the speaker.

For example, a device may comprise a network interface, a speaker, and a controller configured to control (e.g., autonomously control) an output of the speaker based on the type of audio signal to be rendered by the speaker. For instance, in some examples, the controller can adjust audio settings that drive speaker operation to increase/decrease the amplitude and/or adjust (e.g., to flatten or otherwise alter) the frequency response of audio rendered by the speaker when the audio is speech. Conversely, in some examples, the controller can adjust audio settings that drive speaker operation to minimize distortion of pre-processed sounds so as to allow the speaker to output such pre-processed sounds with sonic characteristics that closely match the original intended characteristics of the sound. The device may be an image capture device or other sensor, for example, that is disposed at a location being monitored. In some examples, using the network interface, the device may establish a session (e.g., a communication session) with a remote device, and receive audio (including speech) from the remote device. Thus, in some instances, the controller may adjust (e.g., automatically adjust) one or more signal processing parameters of the speaker based on information acquired when the session is established. In some examples, the device further includes a microphone and can be configured to support two-way communication sessions with a remote device.

According to certain examples, the device can be configured to apply one speaker profile for speech or other unprocessed audio signals and another for processed audio signals (e.g., system sounds), for example. As used herein, the term system sound refers to a processed audio signal (e.g., a siren, chime, chirp, pre-recorded message, or other notification sound) that can be output by the device in response to some condition, event, or circumstance, examples of which are described below. The two (or more) speaker profiles can have different audio processing settings based on the different types of audio signals to be output. For example, a first (e.g., "speech") speaker profile may include dynamic range compression (DRC) and an equalization curve applied to flatten the speaker response to fit a target frequency response for clear, coherent human speech, whereas a second (e.g., "processed audio") speaker profile may include less compression and equalization settings adjusted to accommodate potentially very loud processed sounds, such as a siren, for example.

These and other features are described in further detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 13). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices. Any one or more of the location-based devices may include one or more computing devices (e.g., as described below with reference to FIG. 13).

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the monitored location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other loT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B & 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110).

Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figure 2:
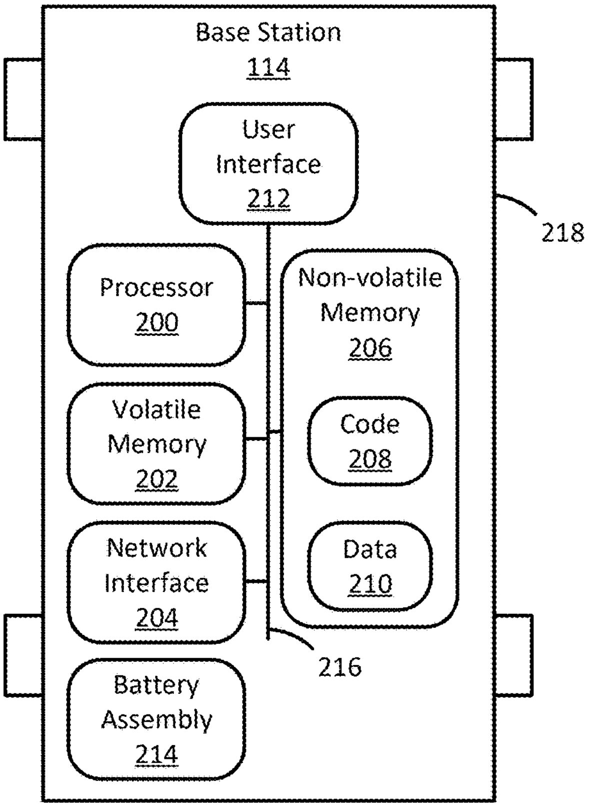
FIG. 2 is a schematic diagram of a base station, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Figure 3:
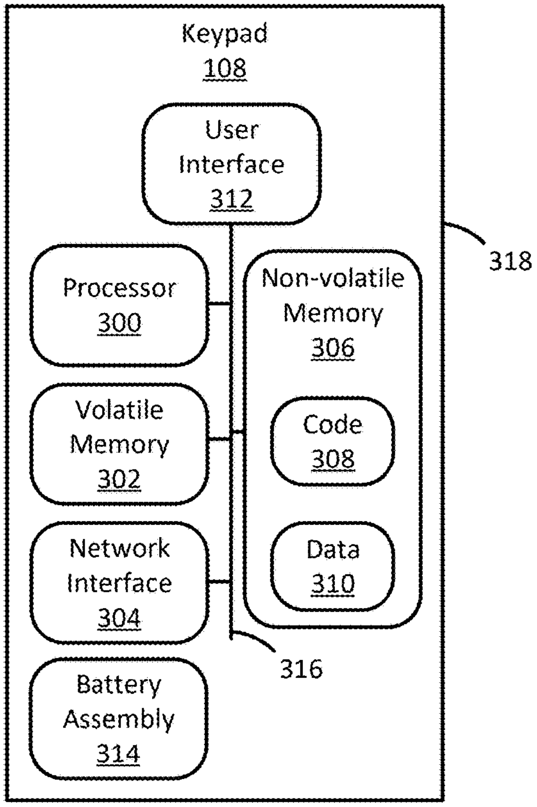
FIG. 3 is a schematic diagram of a keypad, according to some examples described herein.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
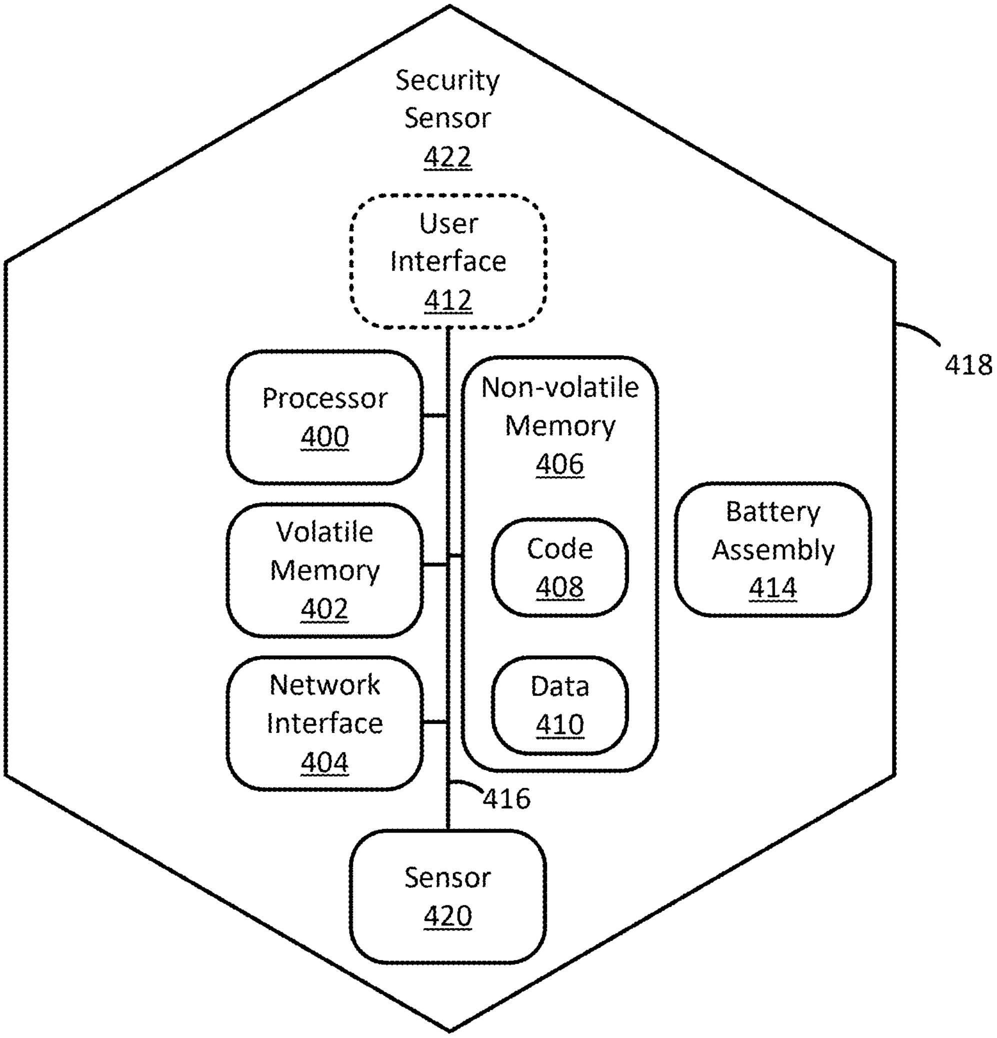
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
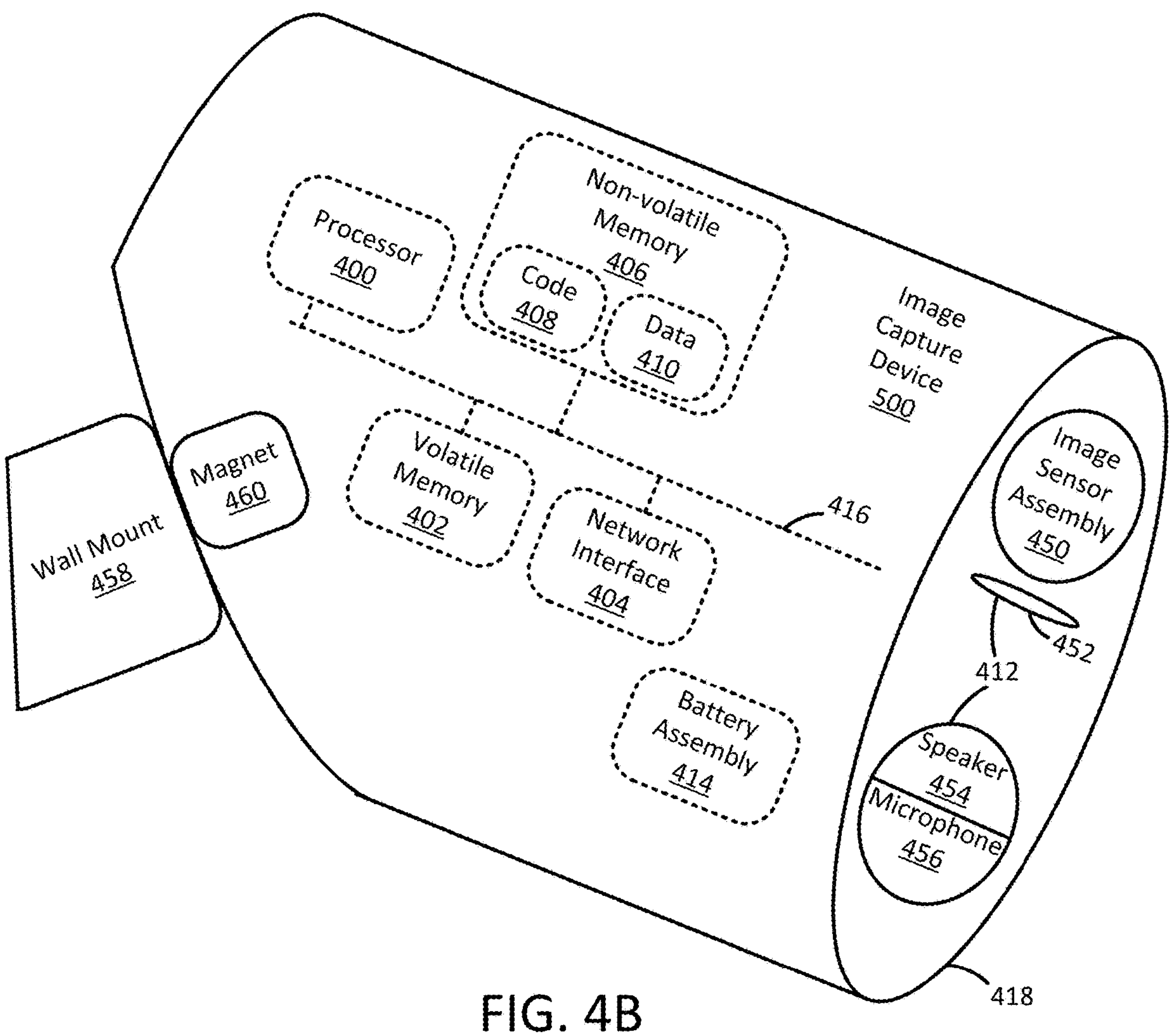
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
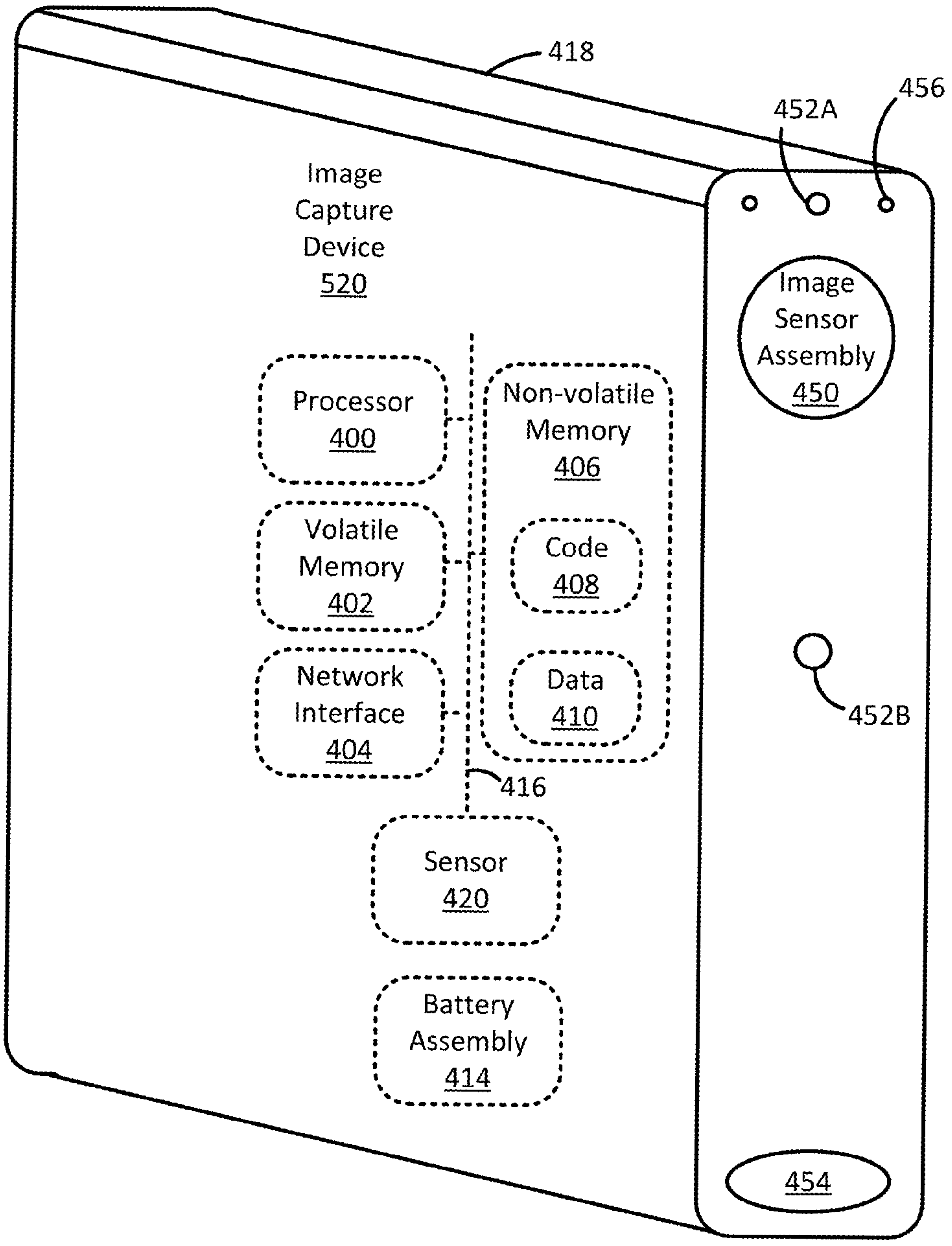
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
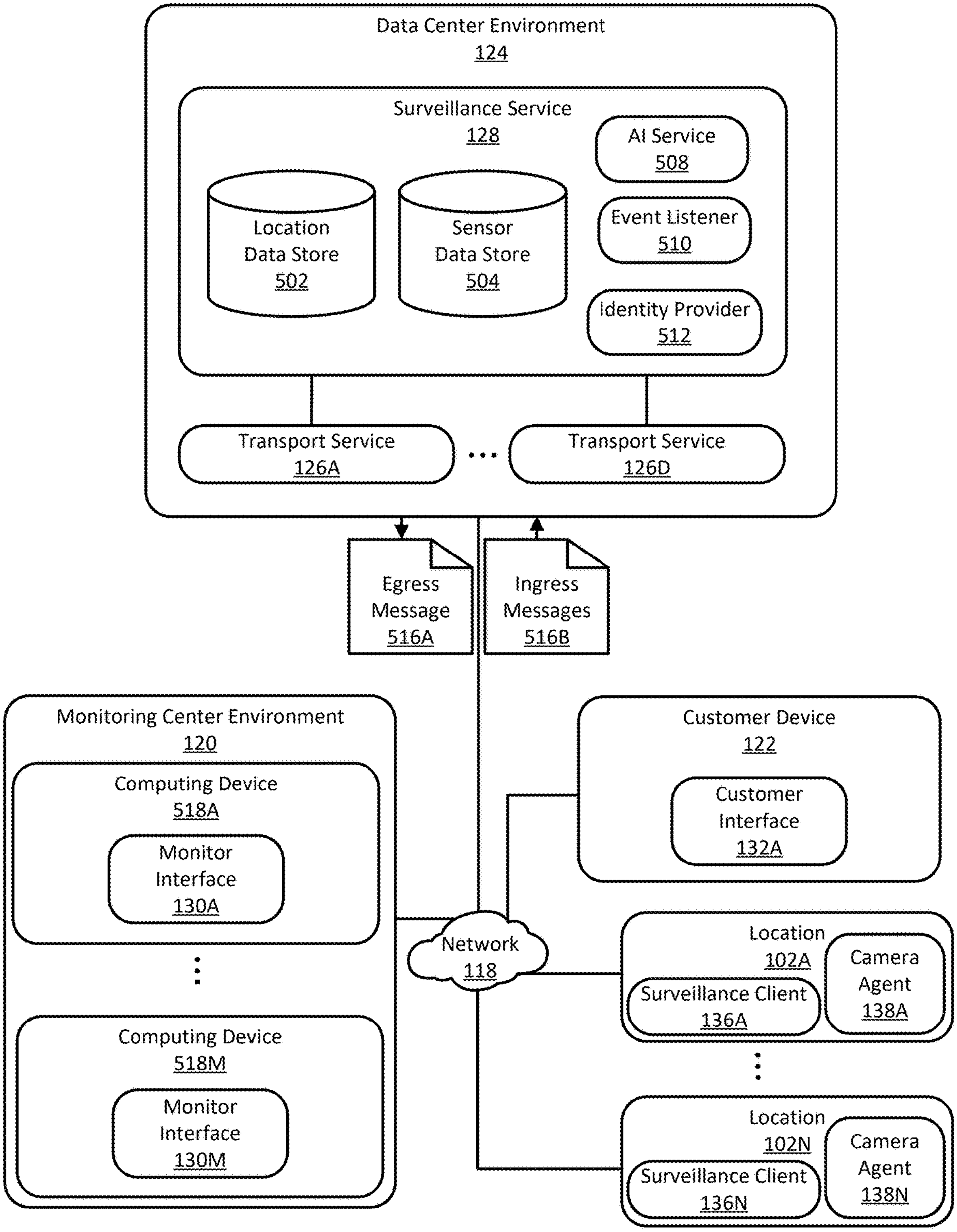
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be use, for example, where the sensor data house therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
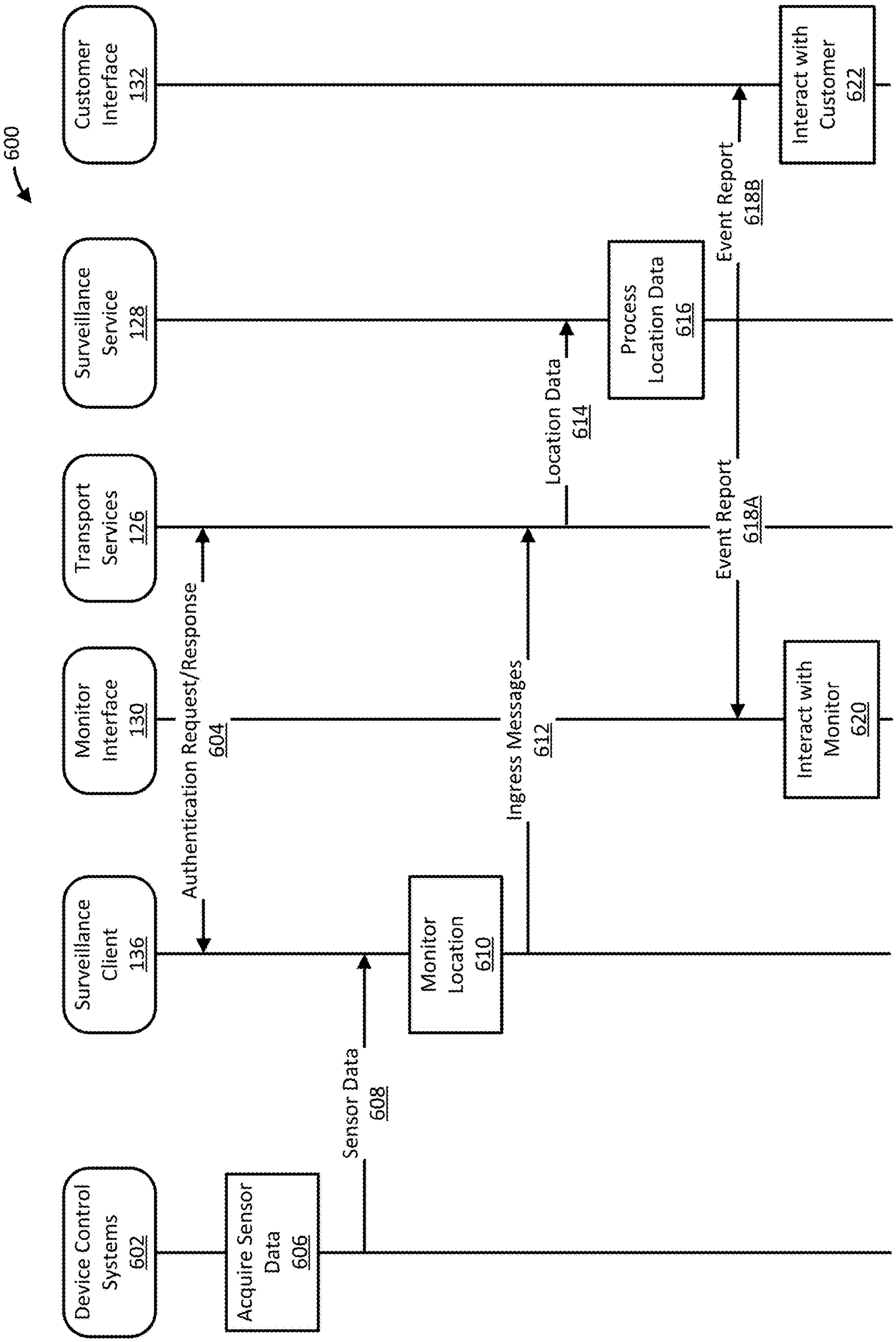
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire (at operation 606) sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more events that warrant reporting to a user. In some examples, the monitor interface 130 is configured to interact with monitoring personnel to both receive input and render output regarding alarms triggered at monitored locations, such as the location 102A. For instance, in some examples, the monitor interface 130 is configured to notify monitoring personnel of the occurrence of alarms at monitored locations, render audio-visual data and other sensor data collected by location-based devices at the monitored locations and stored in the data stores 502 and/or 504, and establish real-time connections with location-based devices. Further, in some examples, the monitor interface 130 includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Service Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be translated, by the monitor interface 130, into events that are communicated to the surveillance service 128 via a monitoring API, for example.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
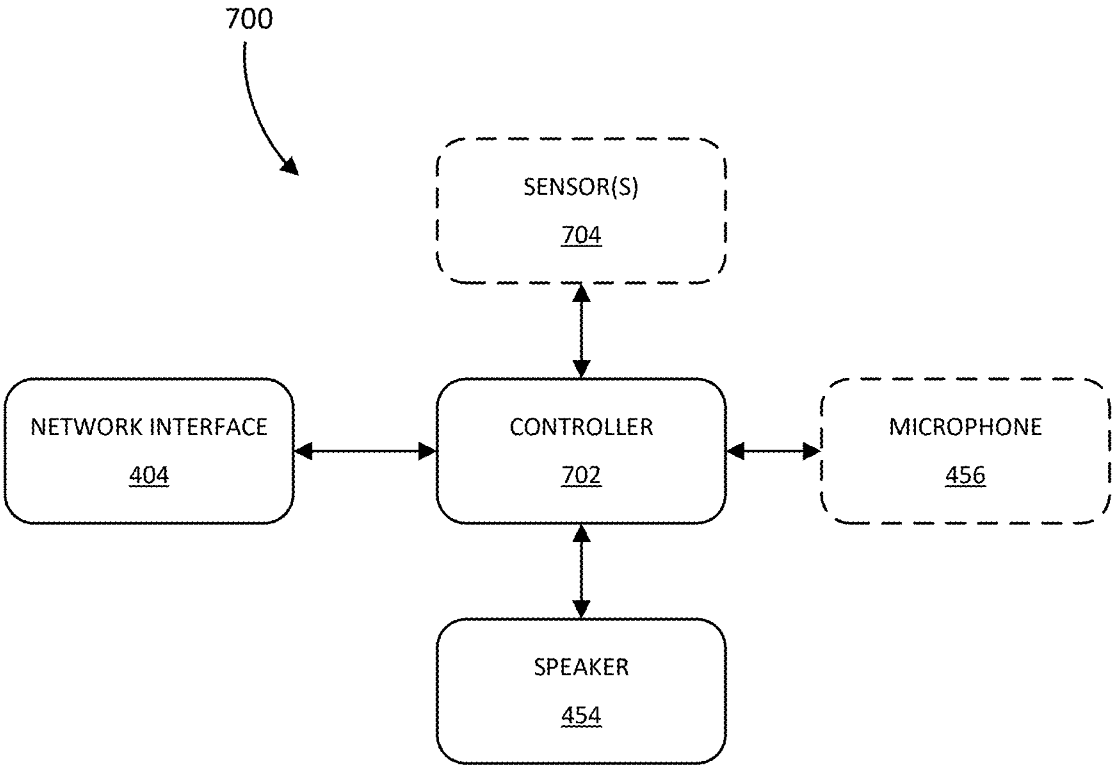
FIG. 7 is a block diagram of certain components of a device, according to some examples described herein.

Turning now to FIG. 7, there is illustrated a block diagram of a device 700 to control configuration and/or operation of a speaker in accordance with aspects disclosed herein. The device 700, or some components thereof, may include or be part of the image capture device 500 or 520, for example. In other examples, the device 700 may be part of another type of monitoring and/or communication device, such as smart home hub, a smart thermostat, an automated lighting device, a smart speaker, etc. The device 700 includes a controller 702, the speaker 454, and the network interface 404. The speaker 454 may include one or more audio transducers (e.g., speaker drivers), along with various audio processing components (e.g., one or more amplifiers, filters, digital to analog converters, and/or digital signal processors). The device 700 may further include one or more sensors 704, such as one or more imaging sensors (e.g., the image sensor assembly 450 described above) and/or one or more motion detectors, for example. In other examples, the device 700 may be coupled (e.g., via a wired or wireless connection) to one or more sensors 704 that are not co-located with the device 700.

According to certain examples, the device 700 is configured to support one-way or two-way communication sessions with a remote device. Thus, in some examples, the device 700 further includes the microphone 456 to allow for such two-way communications. As described above, in some instances, such as during the handling of an alarm, it may be desirable to establish communications between an individual (referred to herein as a person) at the monitored location 102A and remotely-located monitoring personnel. Accordingly, the device 700 can be configured to support a session (e.g., a communication session) with a remote device, such as one of the monitor interfaces 130 in the monitoring center environment 120, via the network interface 404, the speaker 454, and optionally the microphone 456. In some examples, the session is a two-way, real-time communication session. Accordingly, the network interface 404 may include a web real-time communication (WebRTC) client, for example, that allows the device 700 to establish a real-time communication session with external devices (e.g., one of the monitor interfaces 130). A real-time communication session may refer to any mode of telecommunications in which participants can exchange information instantly or with negligible latency or transmission delays. In this context, the term real-time is synonymous with live.

The controller 702 may include one or more processors (e.g., processor 400 and/or processor 1302 described below with reference to FIG. 13), along with computer-readable memory (e.g., volatile memory 1304 and/or non-volatile memory 1308 described below with reference to FIG. 13) storing program instructions (e.g., code 1310 described below with reference to FIG. 13) that configure the controller 702 to perform the various functions described below. The controller 702 is coupled to the network interface 404 and the speaker 454. In examples in which the device 700 includes the sensor(s) 704 and/or the microphone 456, these component(s) are also coupled to the controller 702.

In some examples, the controller 702 is configured to alter, adjust or otherwise modify one or more parameters of the speaker 454 (such as output volume, compression, and/or frequency response, for example). In particular, the controller 702 can alter, configure, or adjust a speaker profile of the speaker 454 based on the type of sound to be output by the speaker 454. As described herein, a speaker profile is a collection of speaker settings that produce a certain output from a speaker. For example, the speaker profile may include one or more audio processing settings/parameters, such as equalization, filtering, compression, and/or gain. By changing the speaker profile based on the type of audio signal to be rendered or otherwise outputted by the speaker 454, the performance of the speaker can be enhanced and optionally optimized for different types of audio signals.

As described above processed signals may include a variety of pre-recorded, pre-processed audio signals that may be output by the device 700 in different circumstances. For example, the device 700 may store certain pre-programmed sounds (e.g., chimes, siren sounds, beeps, etc.) or messages (e.g., alarm messages, warnings, notifications, etc.) in memory (e.g., volatile memory 1304 or non-volatile memory 1308) that is accessible by the controller 702. The controller 702 (e.g., via processor 1302) can be configured to control the speaker 454 to output one or more of these sounds or messages in response to certain events or conditions. For example, processed sounds may include one or more notification sounds (e.g., chimes, beeps, etc.) that indicate various status updates related to the device 700 itself and/or notify a listener to occurrence of an event. For example, the device 700 may be programmed to emit a chime, beep, or other notification sound when certain conditions occur, such as when the device is turned on, when the battery is low, when a connection is established between the device and a remote device, or when one of the sensor(s) 704 detects an event, to name a few examples. The device 700 can be programmed to emit different notification sounds for different conditions. In some examples, the device 700 can be programmed to emit a sound to alert the listener to some other event at the monitored location 102A, such as delivery of a package or arrival of a person at the front door, for example. Again, these notification sounds may be different for different events, and may be different from notification sounds used to alert the listener to one or more conditions related to the device 700 itself. In examples in which the device 700 is a security device, another pre-processed sound may be a siren that is emitted when an alarm event is triggered, for example, as described above. In further examples, processed sounds can include pre-processed speech, such as one or more recorded messages (e.g., alarm messages, warnings, system status updates, event reports, etc.).

Processed audio signals, in many instances, may require little or no additional audio processing for output by the speaker 454. Accordingly, it may be preferable to configure the speaker 454 to reproduce individual processed audio sounds that are as close as possible to the original sound intended by the sound designer to maximize sound quality and/or effectiveness. In contrast, during a communication session with a remote device, when the audio signals to be output by the speaker 454 represent incoming unprocessed audio (e.g., speech) from the remote device, the output sound quality may be significantly enhanced via audio processing performed by the device 700. Accordingly, in some examples, the controller 702 can be configured to apply a different speaker profile based on whether the audio signal to be rendered is a processed or unprocessed audio, such as speech during a communication session, for example.

In some examples, the controller 700 may select between two (or more) different speaker profiles, in which individual profiles have particular audio processing settings (e.g., filtering, gain, compression, equalization, etc.), depending on the type of audio signal being handled. For example, the device 700 can be programmed with two or more distinct speaker profiles, such as a first speaker profile (e.g., a "speech profile") for handling audio signals received during a communication session established via the network interface 404 and a second speaker profile (e.g., a "system profile") for handling processed signals. In some examples, the first speaker profile may have audio parameters configured to enhance audio quality or loudness, in particular speech quality or loudness. For example, the first speaker profile may include dynamic range compression and an equalization curve applied to flatten the speaker response to fit a target frequency response for clear, coherent human speech, as described further below. The second speaker profile may apply minimal, if any, compression to avoid distorting the intended sound characteristics of the processed sounds, for example. In some examples, some processed audio can include very loud sounds. For example, during an alarm event, it may be desirable for the speaker to produce a very loud siren (e.g., at 90 decibels (dB) or 95 dB) in order to deter intruders and/or alert neighbors or passersby to a potential issue at the location. Accordingly, the second speaker profile may include equalization settings that are adjusted to allow the acoustic resonators of the speaker 454 to fully amplify the siren to achieve a high volume output without (or with minimal) distortion.

In some instances, it may also be desirable that the speaker 454 output speech at relatively high volume. For example, during a communication session, a person at the location 102A may be located fairly distant from the device 700. Accordingly, it may be preferable for the speaker 454 to have a high volume setting to increase the probability that the distant person can hear the audio output by the speaker. However, the audio processing parameters for loud speech and a loud siren, for example, are different. For example, accommodating high volume speech may involve adjusting dynamic range compression settings, as described further below, whereas, as described above, for some processed audio signals (even a loud siren), it may be preferable to minimize applied compression. Thus, by configuring the controller 702 to select a speaker profile having appropriate audio processing parameters for different types of audio signals, the acoustic performance of the device 700 may be improved for both unprocessed audio signals (e.g., speech) and processed audio (e.g., pre-recorded sounds).

As described above, incoming unprocessed speech received during a communication session, for example, may have different characteristics than processed audio (e.g., pre-recorded sounds). For example, speech is generally highly dynamic and variable, with large variations in amplitude, rhythm (e.g., time between instances of high volume/activity and instances of low volume/no activity), and frequency content. As a result, signals representing unprocessed speech typically have a high crest factor. As used herein, crest factor describes the difference (i.e., the delta) between the peak and average levels of a signal.

Figure 8A:
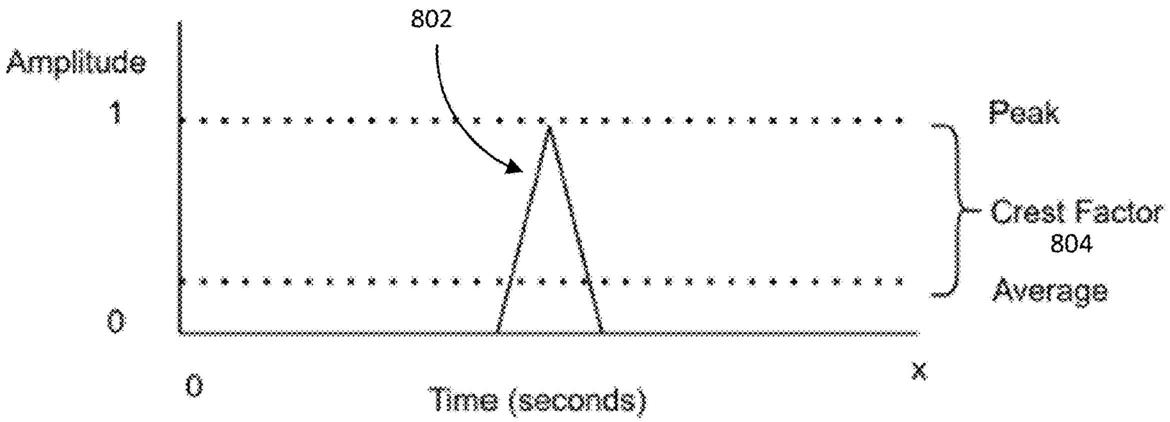
FIG. 8A is a graph illustrating an example of a signal having a high crest factor, according to some examples described herein.
Figure 8B:
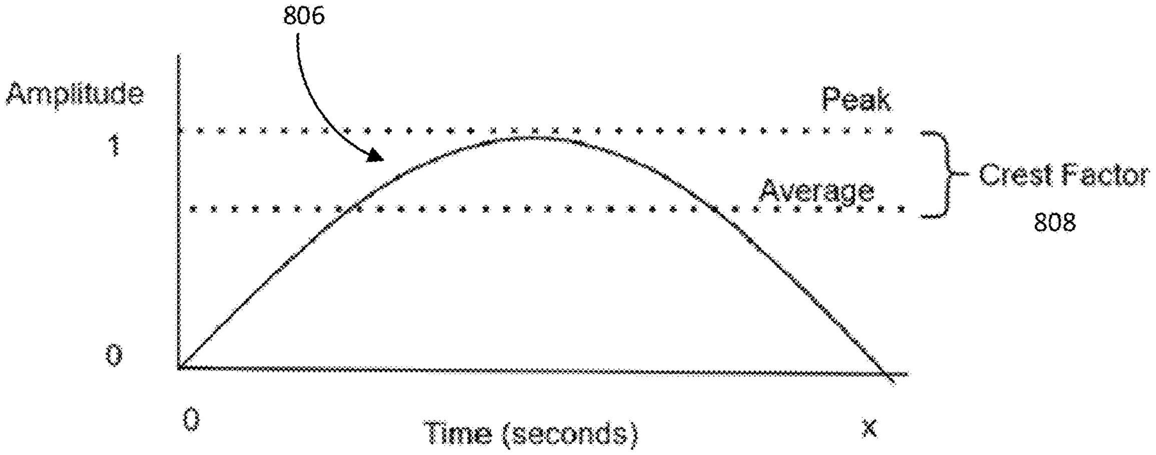
FIG. 8B is a graph illustrating an example of a signal having a low crest factor, according to some examples described herein.

For example, referring to FIG. 8A, there is illustrated an example of a signal 802 having a high crest factor. FIG. 8A illustrates the signal 802 in terms of normalized amplitude as a function of time. The signal 802 has high peak and relatively low average signal level, resulting in a high crest factor 804. For comparison, FIG. 8B illustrates an example of a signal 806 having a low crest factor. FIG. 8B also illustrates the signal 806 in terms of normalized amplitude as a function of time. In this example, the signal 806 has an average signal level that is much closer to the peak, resulting in a low crest factor 808.

Figure 9:
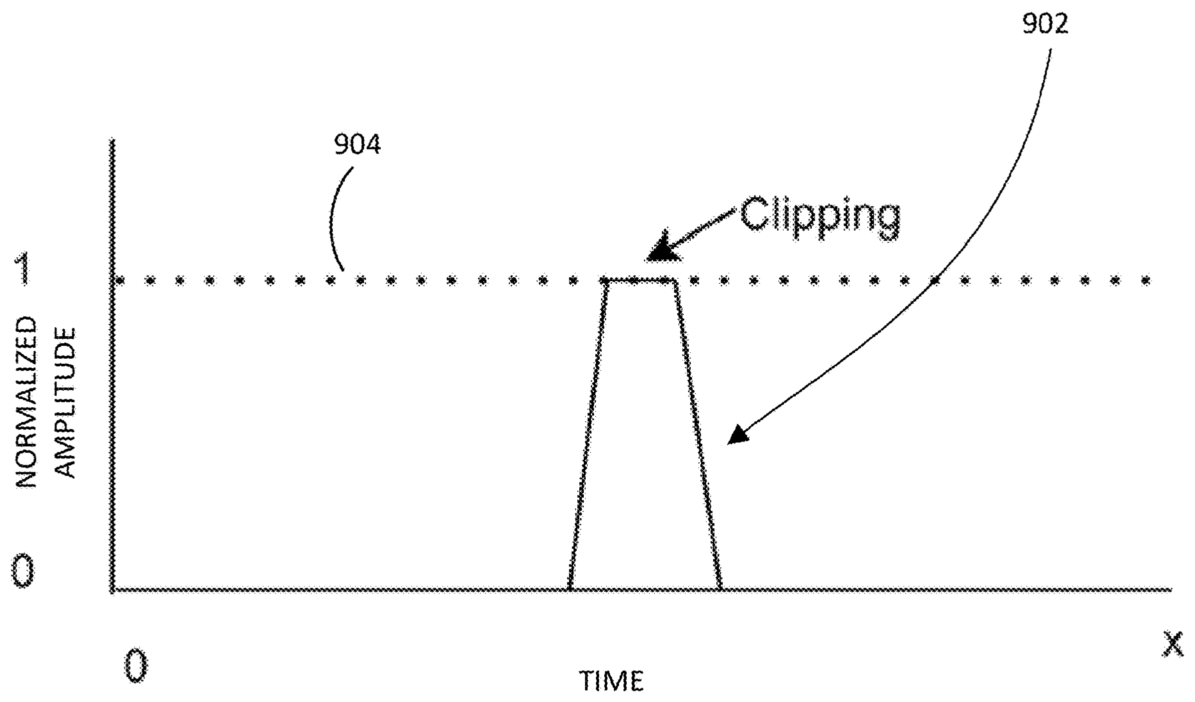
FIG. 9 is a graph illustrating an example of signal clipping, according to some examples described herein.

In order to maximize speaker output volume, signal processing can be applied to maximize the average signal amplitude. As described above, pre-processed audio signals can have this signal processing already built in. For low crest factor signals, the signal can be amplified to increase the average signal level by increasing the gain. However, for high crest factor signals, adding gain without compression can quickly result in distortion. FIG. 9 illustrates an example of this problem.

Referring to FIG. 9, there is illustrated an example of a type of signal distortion (clipping) that can occur when a signal having a high crest factor is amplified. For signals with a high crest factor, such as the signal 802 illustrated in FIG. 8A, for example, if gain is applied to increase the average signal level (to make the sound louder), the signal will start to clip, meaning that the signal peaks exceed the maximum amplitude that the system is designed to handle. FIG. 9 illustrates an example of an amplified signal 902. As shown in FIG. 9, clipping causes a sharp cap to the peak of the signal at the maximum amplitude 904. This sharp cap in the signal 902 results in harsh harmonic distortion.

Figure 10:
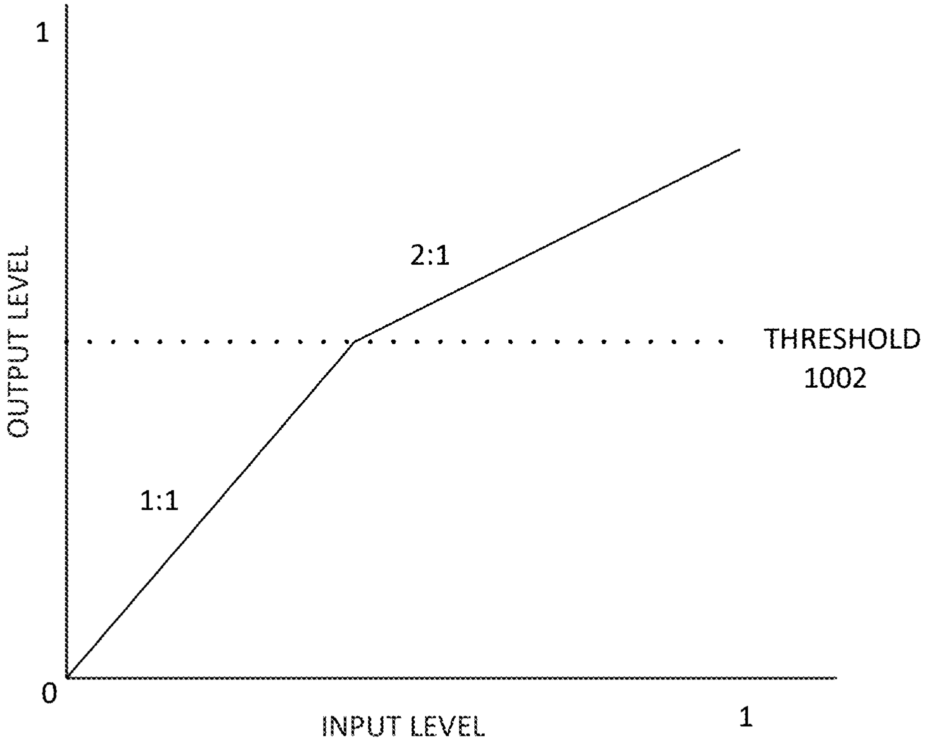
FIG. 10 is a graph illustrating an example of dynamic range compression, according to some examples described herein.

Dynamic range compression (DRC) is a signal processing technique that allows for signals with high crest factors to be amplified while reducing the peaks to avoid clipping. In some examples, once the signal level reaches a threshold value, the signal is scaled (compressed) by a ratio beyond that point. FIG. 10 illustrates an example of a 2:1 compression ratio being applied above a set threshold 1002. In this example, incoming signal levels above the threshold 1002 are reduced by a factor of 2:1. In some examples, an attack/release time component can be included in dynamic range compression processing. In such examples, the gain is reduced slowly up to the specified ratio ("attack") and increased slowly after the signal drops below the threshold 1002 ("release"). A slower attack time (e.g., >32 milliseconds (ms)) in combination with a low compression ratio (e.g., 2:1) allows for more dynamics in a high crest factor signal, such as speech, while a fast attack time (e.g., <16 ms) in combination with a high compression ratio (e.g., 8:1) will result in fewer dynamics and an overall louder, but less natural, sound. The release time also affects the dynamics similarly. The use such non-linear amplification can be helpful for increasing the perceived loudness of previously unprocessed audio (e.g., speech) by boosting the signal and lowering the peaks to fit within the system amplitude limits (e.g., the maximum signal amplitude the system is designed to handle) with less distortion than clipping. Some distortion may still be added; however, it may be significantly less than the distortion caused by clipping. However, for processed, low crest factor signals, such as a siren or chime, for example, non-linear amplification from dynamic range compression causes distortion and is not helpful. For example, the attack/release times used in dynamic range compression can change the acoustic characteristics of processed audio (e.g., system sounds), making them sound different than intended. Thus, by applying at least two different speaker profiles, such as the first speaker profile optimized for speech and including dynamic range compression and the second speaker profile in which dynamic range compression is not used, the speaker 454 can be configured to produce high quality output sound for both types of signals.

Figure 11:
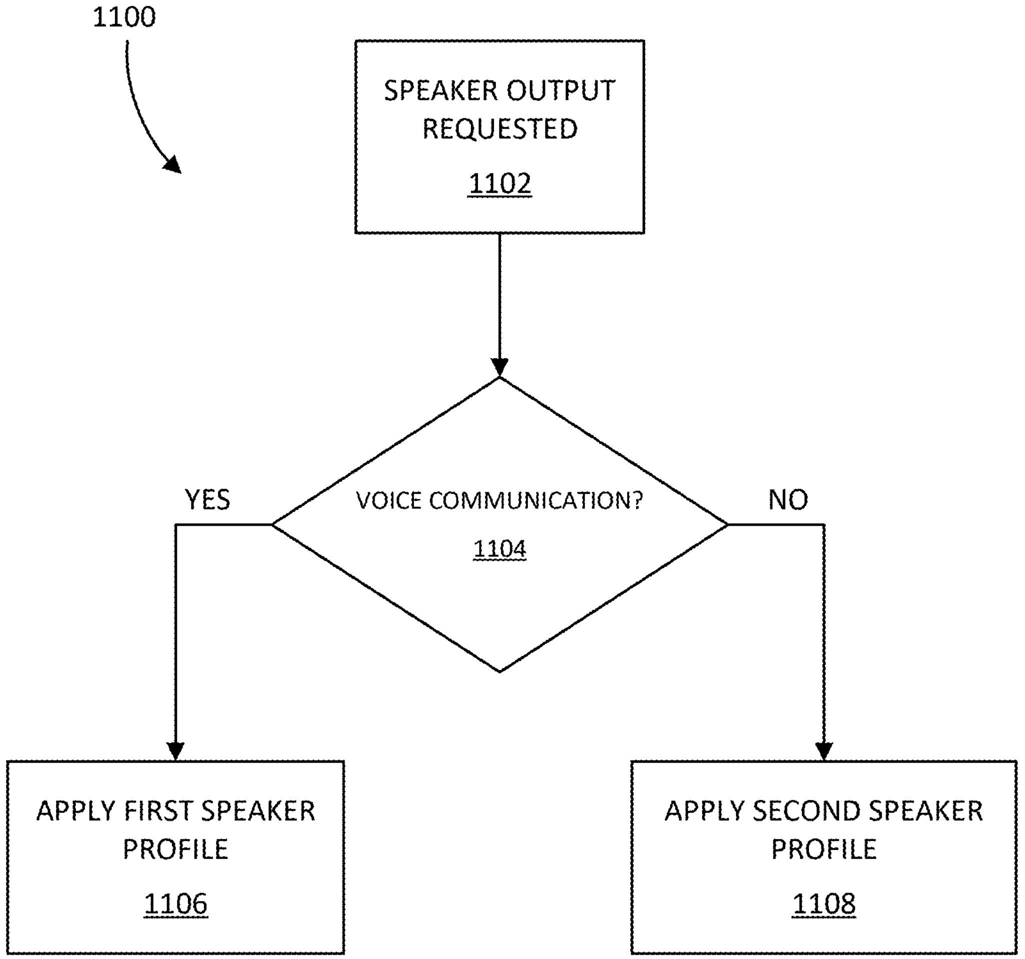
FIG. 11 is a flow diagram of a method of adjusting an output of a speaker using speaker profiles according to some examples described herein.

Referring now to FIG. 11, there is illustrated a flow diagram of one example of a method 1100 of operating the device 700 to apply different speaker profiles depending on the type of signal to be output by the speaker, according to certain aspects.

At operation 1102, the controller 702 processes a request to operate the speaker 454. As described above, in some examples, processed sounds (e.g., pre-recorded system sounds such as those described above) can be output by the speaker 454 in response to certain conditions or events (e.g., conditions of the device 700 or occurrence of events about which the device 700 is configured to notify a person). Accordingly, upon occurrence of such a condition or event, the controller 702 may detect a signal (e.g., a signal from another device connected to the device 700 via the network interface 404, or an internal binary or other signal indicating the occurrence of the condition/event) that indicates that the controller 702 is to operate the speaker 454 to emit a corresponding output (e.g., a pre-recorded or pre-processed sound). This signal may thus represent a request to operate the speaker 454 to emit processed audio (e.g., a system sound). In another example, the controller 702 may receive, via the network interface 404, a request to establish a communication session with a remote device, such as one of the monitor interfaces 130 or customer interfaces 132, as described above. Accordingly, this signal may represent a request to operate the speaker 454 to emit audio signals received from the remote device.

At operation 1104, the controller 702 determines whether or not the audio to be output by the speaker 454 is previously unprocessed speech or one or more processed audio signals (e.g., pre-recorded audio, as described above). In some examples, the controller 702 may make this determination based on the source of the audio signal(s) to be output by the speaker 454. In some examples, the request signals processed by the controller 702 at operation 1102 may include identifying information that conveys the source of the request signal. For example, signals representing occurrence of a condition or event may include information (e.g., sensor data, or event data from the base station 114, as described above with reference to FIG. 1) identifying that condition/event, or the device or component from which the signal originated. This information can be used by the controller 702 to determine that the sound to be output by the speaker 454 is a processed audio signal (e.g., a system sound). In contrast, based on receiving a request to establish a communication session with a remote device, the controller 702 may determine that the sound to be output by the speaker 454 is speech received via the remote device. In other examples, the controller 702 may make the determination at operation 1104 based on one more characteristics of the audio signal to be output by the speaker. For example, as described above, signals representing unprocessed speech typically have a high crest factor. Accordingly, in some instances, the controller 702 may process the audio signal to determine the crest factor and, based on the crest factor exceeding a certain threshold, determine that the audio signal represents unprocessed speech.

Accordingly, based on the determination at operation 1104, the controller 702 may select and apply an appropriate speaker profile. For example, if the audio signals to be output by the speaker 454 represents previously unprocessed speech (e.g., received at the device 700 during a communication session with a remote device), the controller 702 may select, at operation 1106, the first speaker profile that includes speaker settings selected to enhance the audio quality and clarity of the speech. For example, as described above, the first speaker profile can include dynamic range compression, optionally along with equalization settings to alter the speaker frequency response to fit a target frequency response for human speech. In contrast, if the audio signals to be output by the speaker 454 are one or more processed audio sounds (e.g., system sounds), the controller 702 may select, at operation 1108, the second speaker profile that includes speaker settings (e.g., equalization, gain, etc.) selected to maintain the original sound characteristics intended by the sound designer of the processed signal(s). For example, as described above, the second speaker profile may not include dynamic range compression that could distort the acoustic characteristics of the processed audio signals. In some examples, the second speaker profile may include a minimal amount of compression to protect the speaker 454 in the event of very loud processed signals (e.g., a loud siren). As described above, the second speaker profile may further include equalization settings that allow the speaker 454 to accommodate loud processed signals, such as a loud siren, for example.

Figure 12:
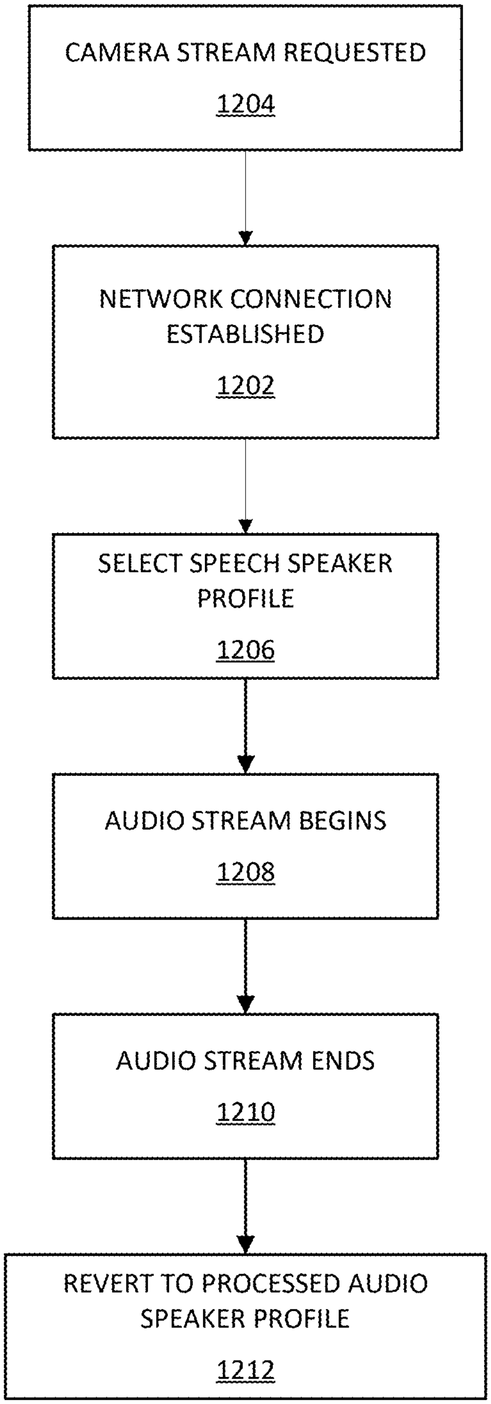
FIG. 12 is a flow diagram of a method of selecting a speaker profile during a communication session, according to some examples described herein.

In other examples, the device 700 can be configured to apply a default speaker profile suitable for outputting processed audio signals, and to switch (e.g., dynamically switch) to apply a speech-optimized speaker profile based on a need to process incoming speech signals. According to certain examples, the controller can be configured to apply (e.g., automatically apply) a speech-optimized speaker profile based a communication session being established between the device 700 and a remote device (e.g., one of the monitor interfaces 130). Referring to FIG. 12, there is illustrated an example of a process 1200 that can be applied by the device 700. The process 1200 includes automatically applying speaker profile with audio processing settings adapted for previously unprocessed audio (e.g., speech), as described above.

At operation 1202, a network connection is established between the device 700 and a remote device via the network interface 404. This network connection is used to support a session (e.g., a communication session) with the remote device. As described above, in some examples, the device 700 may be configured to establish a two-way, real-time communication session with the remote device (e.g., using the network interface 404, the speaker 454, and the microphone 456). During the communication session, previously unprocessed audio (e.g., speech) can be received in an audio stream from the remote device. For example, a monitoring professional may speak to a person at the location of the device 700 via one of the monitoring interfaces 130. The speech from the monitoring professional can be transmitted to the device 700 via the network interface 404 (e.g., using any of various communication protocols as described above) and rendered via the speaker 454.

As described above, in some examples, the device 700 includes, or is part of, an image capture device, such as the image capture device 500 or 520, for example. In other examples, the device 700 may be coupled to an image capture device and configured to acquire imagery from the image capture device. In such examples, a person using the remote device (e.g., a customer or monitoring professional) may wish to view images (still or video) acquired by the image capture device. In some examples, therefore, the device 700 may provide such imagery during the communication session established with the remote device. In such examples, the process 1200 may include an operation 1204 of receiving, at the device 700, a request from the remote device to provide camera imagery (e.g., a video stream from the image capture device 500 or 520). In some examples, the network connection can be established at operation 1202 in response to receiving, at operation 1204, the request to supply the camera imagery. In other examples (e.g., where the device 700 is not part of or coupled to an image capture device), the process 1200 may omit operation 1204.

At operation 1206, based on the network connection being established between the device 700 and the remote device, thus indicating that a communication session is about to begin, the controller 702 may apply (e.g., select) a speaker profile for the speaker 454 having audio processing parameters configured to enhance the quality and/or clarity of the speech in the audio output, as described above. For example, the speaker profile selected at operation 1206 may be a speaker profile that includes dynamic range compression, as described above. Prior to selecting the speech-focused speaker profile at operation 1206, the device 700 may, as a default, apply a different speaker profile suitable for outputting processed audio (e.g., system sounds), as described above. As described above, a speaker profile includes a collection of audio signal processing settings (e.g., equalization, filter slope, DRC parameters, such as ratio, gain, etc.) that can be stored in memory (e.g., non-volatile memory 1308 described below with reference to FIG. 13) and accessed by one or more processors of the controller 702. For example, as described further below, the controller 702 may include a digital signal processor responsible for executing signal processing for the speaker 454. In some examples, to apply the speaker profile at operation 1206, the controller 702 may retrieve from memory the collection of audio signal processing settings corresponding to the new/selected speaker profile, and overwrite an existing memory configuration of the digital signal processor responsible for the signal processing with the collection of settings corresponding to the new speaker profile.

At operation 1208, reception and processing of an incoming audio stream from the remote device begins at the device 700. The audio stream may be processed according to the speaker profile selected at operation 1206.

At operation 1210, the communication session between the device 700 and the remote device is terminated, thus ending reception and processing of the incoming audio stream at the device 700. Accordingly, based on termination of the communication session, at operation 1212, the device 700 may revert (e.g., automatically revert) to a speaker profile more appropriate for handling processed audio signals that may be output by the speaker 454. For example, as described above, a "processed audio" speaker profile may not include dynamic range compression. To revert to the processed audio speaker profile, the controller 702 may retrieve from memory the collection of signal processing settings/parameters for that speaker profile, and overwrite the memory configuration of the digital signal processor to apply the speaker profile in the same manner as described above. By reverting to the processed audio speaker profile when a communication session is terminated, the device 700 can be readied to output processed signals, such as system sounds, for example, whenever the need arises. The device 700 can be reconfigured to process speech when a new communication session is established.

Figure 13:
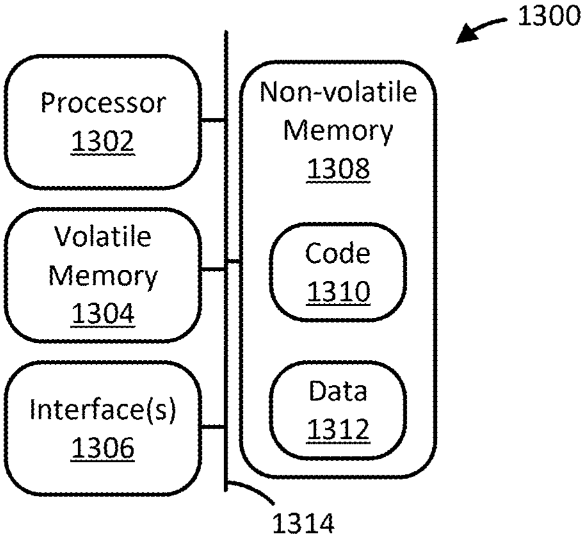
FIG. 13 is a schematic diagram of a computing device, according to some examples described herein.

Turning now to FIG. 13, a computing device 1300 is illustrated schematically. As shown in FIG. 13, the computing device includes at least one processor 1302, volatile memory 1304, one or more interfaces 1306, non-volatile memory 1308, and an interconnection mechanism 1314. The non-volatile memory 1308 includes code 1310 and at least one data store 1312. The computing device 1300 may be used to implement various components (or parts thereof) of the device 700, including, for example, the controller 702. The code 1310 may include any or all of the code 208, 308, and/or 408 described above. The data store 1312 may store collections of signal processing settings/parameters corresponding to individual speaker profiles, as described above, for example.

In some examples, the non-volatile (non-transitory) memory 1308 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1310 stored in the non-volatile memory can include an operating system and one or more applications or programs that are configured to execute under the operating system. Alternatively or additionally, the code 1310 can include specialized firmware and embedded software that is executable without dependence upon a commercially available operating system. Regardless, execution of the code 1310 can result in manipulated data that may be stored in the data store 1312 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms. The non-volatile memory 1308 may be used to implement any of the non-volatile memory 206, 306, and/or 406 described above.

Continuing the example of FIG. 13, the processor 1302 can be one or more programmable processors to execute one or more executable instructions, such as a computer program specified by the code 1310, to control the operations of the computing device 1300. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1304) and executed by the circuitry. In some examples, the processor 1302 is a digital processor, but the processor 1302 can be analog, digital, or mixed. As such, the processor 1302 can execute the function, operation, or sequence of operations using digital values and/or using analog signals. In some examples, the processor 1302 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1302 that are multicore can provide functionality for parallel, simultaneous execution of instructions or for parallel, simultaneous execution of one instruction on more than one piece of data. The processor 1302 may be used to implement any of the processors 200, 300, and/or 400 described above. In some examples, the processor 1302 includes a digital signal processor responsible for handling audio signal processing for the speaker 454, as described above.

Continuing with the example of FIG. 13, prior to execution of the code 1310 the processor 1302 can copy the code 1310 from the non-volatile memory 1308 to the volatile memory 1304. In some examples, the volatile memory 1304 includes one or more static or dynamic random access memory (RAM) chips and/or cache memory (e.g. memory disposed on a silicon die of the processor 1302). Volatile memory 1304 can offer a faster response time than a main memory, such as the non-volatile memory 1308. The volatile memory 1304 may be used to implement any of the volatile memory 202, 302, and/or 402 described above.

Through execution of the code 1310, the processor 1302 can control operation of the interfaces 1306. The interfaces 1306 can include network interfaces (e.g., the network interface 404). These network interfaces can include one or more physical interfaces (e.g., a radio, an ethernet port, a USB port, etc.) and a software stack including drivers and/or other code 1310 that is configured to communicate with the one or more physical interfaces to support one or more LAN, PAN, and/or WAN standard communication protocols. The communication protocols can include, for example, TCP and UDP among others. As such, the network interfaces enable the computing device 1300 to access and communicate with other computing devices via a computer network.

The interfaces 1306 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, the button 914, etc.) and a software stack including drivers and/or other code 1310 that is configured to communicate with the user input and/or output devices. As such, the user interfaces enable the computing device 1300 to interact with users to receive input and/or render output. This rendered output can include, for instance, one or more GUIs including one or more controls configured to display output and/or receive input. The input can specify values to be stored in the data store 1312. The output can indicate values stored in the data store 1312.

Continuing with the example of FIG. 13, the various features of the computing device 1300 described above can communicate with one another via the interconnection mechanism 1314. In some examples, the interconnection mechanism 1314 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising determining whether an audio signal to be rendered by a speaker comprises unprocessed speech, and based on determining that the audio signal comprises the unprocessed speech, adjusting one or more signal processing parameters of the speaker to modify one or more audio characteristics of sound output by the speaker.

Example 2 is a method comprising determining, based on a request to operate a speaker, a type of sound to be produced by the speaker, the request being indicative of whether operation of the speaker is for a communications session or to produce a system sound, adjusting one or more parameters of the speaker to output (i) speech, based on the request indicating that operation of the speaker is to be for the communication session, or (ii) or the system sound, based on the request indicating that the operation of the speaker is to produce the system sound, and initiating operation of the rendering sound, using the speaker using the one or more parameters to produce the determined type of sound, based on the data and the one or more parameters.

Example 3 includes the method of Example 2, wherein determining the type of sound includes determining the type of sound to be the speech, and wherein adjusting the one or more parameters of the speaker includes configuring the speaker to apply dynamic range compression.

Example 4 include the method of Example 3, further comprising establishing the communication session with a device, and receiving data during the communication session, the data including the speech.

Example 5 includes the method of Example 4, wherein establishing the communication session includes establishing a two-way, real-time communication session or a one-way communication session.

Example 6 includes the method of any one of Examples 2-5, wherein adjusting the one or more parameters of the speaker includes adjusting an equalization setting of the speaker.

Example 7 include the method of any one of Examples 2-6, adjusting the one or more parameters of the speaker includes switching from a first speaker profile to a second speaker profile, wherein the first speaker profile includes a first equalization setting and a first compression setting, and wherein the second speaker profile includes a second equalization setting different from the first equalization setting and a second compression setting different from the first compression setting.

Example 8 includes the method of Example 7, wherein determining the type of sound includes determining the type of sound to be the speech, and wherein the second compression setting includes dynamic range compression.

Example 9 includes the method of Example 8, wherein the second compression setting includes a first compression applied to signal levels below a threshold and a second compression applied to signal levels above the threshold, wherein a compression ratio between the first compression and the second compression is 2:1.

Example 10 includes the method of Example 7, wherein determining the type of sound includes determining a crest factor of an incoming audio signal representing the sound to be produced by the speaker.

Example 11 is a device configured to implement the method of any one of Examples 1-10.

Example 12 includes the device of Example 11, wherein the device is a security camera.

Example 13 is a device comprising a network interface configured to support a communication session between the device and a remote device, a speaker, and a controller configured to adjust one or more parameters of the speaker based on a source of an audio signal to be output by the speaker, the one or more parameters including at least one of an equalization setting or a compression setting; wherein the source of the audio signal is one of a first source or a second source, the first source being the communication session.

Example 14 includes the device of Example 13, wherein, to adjust the one or more parameters of the speaker, the controller is configured to: apply a first speaker profile for the speaker based on the source of the audio signal being the first source, the first speaker profile having a first equalization setting and a first compression setting; or apply a second speaker profile for the speaker based on the source of the audio signal being the second source, the second speaker profile having a second equalization setting different from the first equalization setting and a second compression setting different from the first compression setting.

Example 15 includes the device of Example 14, wherein the first compression setting includes dynamic range compression.

Example 16 includes the device of Example 15, wherein the dynamic range compression is configured with a 2:1 compression ratio for signal levels above a threshold amplitude.

Example 17 includes the device of any one of Examples 13-16, further comprising a non-transitory computer-readable storage medium coupled to the controller and storing one or more system sounds, wherein the second source of the audio signal is the non-transitory computer-readable storage medium.

Example 18 include the device of Example 17, wherein the one or more system sounds include at least one of a notification chime or a siren.

Example 19 includes the device of any one of Examples 13-18, further comprising a microphone, wherein the network interface is configured to support a two-way communication session between the device and the remote device.

Example 20 includes the device of any one of Examples 13-19, further comprising a camera.

Example 21 includes the device of Example 20, wherein the device is configured to transmit video imagery acquired by the camera to the remote device during the communication session.

Example 22 provides one or more non-transitory computer-readable media storing sequences of instructions executable to control a security camera disposed at a location, the security camera including a speaker and a network interface, and the sequences of instructions comprising instructions to apply a first speaker profile for processing audio signals output by the speaker, the first speaker profile including a first equalization setting and a first compression setting, establish, using the network interface, a communication session with a remote device, based on establishing the communication session, apply a second speaker profile for processing the audio signals output by the speaker, the second speaker profile including a second equalization setting, different from the first equalization setting, and a second compression setting different from the first compression setting.

Example 23 includes the one or more non-transitory computer-readable media of claim 16, wherein the sequences of instructions further comprise instructions to during the communication session, receive from the remote device, one or more audio signals comprising unprocessed speech, wherein the second compression setting comprises dynamic range compression.

Example 24 includes the one or more non-transitory computer-readable media of one of Examples 22 or 23, wherein the sequences of instructions further comprise instructions to, based on termination of the communication session, revert to applying the first speaker profile.

Example 25 includes the one or more non-transitory computer-readable media of any one of Examples 22-24, wherein the sequences of instructions further comprise instructions to output, the with speaker, at least one first audio signal processed according to the first speaker profile, wherein the at least one first audio signal comprises a pre-processed system sound, and wherein the first compression setting does not include dynamic range compression.

Example 26 includes the one or more non-transitory computer-readable media of any one of Examples 22-25, wherein the sequences of instructions further comprise instructions to acquire video imagery, and during the communication session, transmit the video imagery to the remote device.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:

receiving, via a network interface, a request to operate a speaker;

determining, based on data received via the network interface included in the request to operate the speaker, whether the request is for speech to be output by the speaker or for sound other than speech to be output by the speaker;

adjusting, based on determining that the request is for speech, audio processing parameters of the speaker including equalization and compression settings, the adjusting including switching from a first setting to a second setting different from the first setting; and initiating operation of the speaker using the second setting to render the speech.

2. The method of claim 1, wherein adjusting the equalization or compression settings of the speaker includes configuring the speaker to apply dynamic range compression.

3. The method of claim 2, further comprising establishing a communication session with a device; and receiving data during the communication session, the data including the speech.

4. The method of claim 3, wherein establishing the communication session includes establishing a one-way or two-way, real-time communication session.

5. The method of claim 3, further comprising:

acquiring video imagery; and transmitting, during the communication session, the video imagery to the device.

6. The method of claim 3, further comprising:

readjusting, based on termination of the communication session, the equalization or compression settings of the speaker, the readjusting including switching from the second setting to the first setting.

7. The method of claim 1, wherein switching from the first setting to the second setting includes switching from a first compression setting to a second compression setting, the second compression setting including a first compression applied to signal levels below a threshold and a second compression applied to signal levels above the threshold, wherein a compression ratio between the first compression and the second compression is 2:1.

8. A device comprising:

a network interface configured to support a communication session between the device and a remote device;

a speaker; and a controller configured to receive, via the network interface, a request to initiate the communication session, and to adjust, based on data received via the network interface included in the request to initiate the communication session, audio processing parameters of the speaker including equalization or compression settings, the adjusting including switching a speaker profile for the speaker from a first speaker profile to a second speaker profile, wherein the first speaker profile includes a first equalization setting and a first compression setting, wherein the second speaker profile includes a second equalization setting different from the first equalization setting and a second compression setting different from the first compression setting, and to initiate the communication session using the second speaker profile to render audio of the communication session.

9. The device of claim 8, wherein the second compression setting includes dynamic range compression.

10. The device of claim 8, further comprising:

a non-transitory computer-readable storage medium coupled to the controller and storing one or more system sounds;

wherein the controller is configured to apply the first speaker profile based on an instruction to cause the speaker to render one of the one or more system sounds stored on the non-transitory computer-readable storage medium.

11. The device of claim 8, further comprising:

a microphone;

wherein the network interface is configured to support a two-way communication session between the device and the remote device.

12. The device of claim 8, further comprising:

a camera;

wherein the device is configured to transmit video imagery acquired by the camera to the remote device during the communication session.

13. The device of claim 8, wherein the controller is further configured to:

establish, using the network interface, a communication session with the remote device; and during the communication session, receive from the remote device, one or more audio signals comprising unprocessed speech;

wherein the second compression setting comprises dynamic range compression.

14. The device of claim 13, wherein the controller is further configured to:

based on termination of the communication session, revert to applying the first speaker profile.

15. A method comprising:

applying a first speaker profile for processing audio signals output by a speaker, the first speaker profile including a first equalization setting and a first compression setting;

establishing a communication session between a first device and a second device that comprises the speaker, wherein establishing the communication session includes one of transmitting or receiving, via a network interface, a request to establish the communication session; and applying, based on data included in the request to establish the communication session, a second speaker profile for processing the audio signals output by the speaker, the second speaker profile including a second equalization setting, different from the first equalization setting, and a second compression setting different from the first compression setting, wherein applying the second speaker profile includes adjusting audio processing parameters of the speaker from the first speaker profile to the second speaker profile.

16. The method of claim 15, further comprising:

receiving data during the communication session, the data including unprocessed speech; and wherein applying the second speaker profile comprises processing the data according to the second speaker profile.

17. The method of claim 16, wherein processing the data according to the second speaker profile includes applying dynamic range compression to the data.

18. The method of claim 15, wherein establishing the communication session includes establishing a one-way or two-way, real-time communication session.

19. The method of claim 15, further comprising:

reverting, based on termination of the communication session, to applying the first speaker profile.

20. The method of claim 19, wherein applying the first speaker profile comprises:

outputting, with the speaker, at least one audio signal processed according to the first speaker profile, wherein the at least one first audio signal comprises a preprocessed system sound, and wherein the first compression setting does not include dynamic range compression.

* * * * *